(12) United States Patent
Hawes

(10) Patent No.: US 6,484,984 B2
(45) Date of Patent: Nov. 26, 2002

(54) SINGLE-BOLT BAR-BRACKET MOUNT

(75) Inventor: Timothy R. Hawes, Muskegon, MI (US)

(73) Assignee: Fleet Engineers Incorporated, Muskegon, MI (US)

( * ) Notice: Subject to any disclaimer, the term of this patent is extended or adjusted under 35 U.S.C. 154(b) by 0 days.

(21) Appl. No.: 09/738,624

(22) Filed: Dec. 15, 2000

(65) Prior Publication Data

US 2001/0052697 A1 Dec. 20, 2001

Related U.S. Application Data

(60) Provisional application No. 60/171,398, filed on Dec. 21, 1999.

(51) Int. Cl.[7] .............................................. A47B 96/06
(52) U.S. Cl. ............................ 248/220.21; 248/217.3; 248/534; 280/154; 411/187; 411/401
(58) Field of Search ............................. 248/534, 539, 248/220.21, 216.1, 216.4, 217.3, 217.4, 251; 280/154, 847, 851; 411/187, 184, 429, 401

(56) References Cited

U.S. PATENT DOCUMENTS

| | | | | |
|---|---|---|---|---|
| 241,159 A | * | 5/1881 | Sames | |
| 756,393 A | * | 4/1904 | McCausland | |
| 1,282,492 A | * | 10/1918 | Thexton | |
| 1,345,338 A | * | 7/1920 | Baker | |
| 2,146,654 A | * | 2/1939 | Shea et al. | |
| 3,388,884 A | * | 6/1968 | Eggler et al. | 248/222.11 |
| 3,782,757 A | * | 1/1974 | Juergens | 280/851 |
| 3,934,901 A | * | 1/1976 | Hammerly | 280/851 |
| 3,999,776 A | * | 12/1976 | Betts, Sr. | |
| 4,335,862 A | * | 6/1982 | Sherman | |
| 4,779,326 A | * | 10/1988 | Ichikawa | |
| 5,484,126 A | * | 1/1996 | Kitchin | |
| 6,013,351 A | * | 1/2000 | Mahn, Jr. | |
| 6,076,842 A | * | 6/2000 | Knoer | |

* cited by examiner

Primary Examiner—Korie Chan
(74) Attorney, Agent, or Firm—McGarry Bair LLP

(57) ABSTRACT

The invention relates to a bracket-mounting assembly for mounting a bar bracket to a vehicle frame, the bar bracket being adapted to carry vehicle accessories such as a mudflap. The bracket-mounting assembly attaches to a vehicle frame via a single bolt passed through a penetration in the vehicle frame and threadably connected to the bracket-mounting assembly by a central threaded hole in the bracket-mounting assembly. The bracket-mounting assembly further includes a generally vertically-oriented shaft opening for receiving a portion of the bar bracket and supporting the bar bracket with respect to the vehicle frame. The bracket-mounting assembly includes a rotation-resisting connector for inhibiting rotation of the bracket-mounting assembly relative to the vehicle frame about the axis of the bolt.

7 Claims, 2 Drawing Sheets

SINGLE-BOLT BAR-BRACKET MOUNT

CROSS-REFERENCE TO RELATED APPLICATION

This application claims the benefit of U.S. provisional patent application Ser. No. 60/171,398, filed Dec. 21, 1999.

BACKGROUND OF THE INVENTION

1. Field of the Invention

The invention relates to a bracket mount for mounting a bar bracket to al vehicle frame, the bar bracket being adapted to carry vehicle accessories such as a mudflap.

2. Description of the Related Art

Bar brackets are typically mounted to a vehicle frame with a mount comprising a flat plate mated to the vehicle frame, and secured thereto with, typically, two or four mechanical fasteners, requiring an equal number of properly aligned penetrations through the vehicle frame. A body extending from the flat plate, and having a square aperture passing therethrough, is adapted to receive the square cross-section of the typical solid bar bracket.

SUMMARY OF THE INVENTION

According to the invention, a bracket-mounting assembly for mounting, a mudflap bracket to a vehicle frame comprises a body having a frame-mounting portion and a bracket-mounting portion, the frame-mounting portion having a frame face at one side of the frame-mounting portion adapted to abut the vehicle frame and a lateral hole transverse to the frame face and the bracket-mounting portion having a vertically-extending shaft opening extending at least a portion of the way through the body for removably mounting the mudflap bracket; at least one pin mounted in the frame-mounting portion and projecting from the frame face for impinging on a surface of the vehicle frame to resist relative rotation of the body with respect to the vehicle frame; and a bolt received in the lateral hole in the frame-mounting portion for securing the body to the frame.

In one embodiment, the lateral hole is tapped and the bolt is threadably received in the lateral hole. Preferably, the vertically-extending shaft extends through the bracket-mounting portion. In a preferred embodiment, there are multiple pins mounted in the frame-mounting portion and the pins are spaced about the lateral hole.

In another of its aspects, the invention relates to a bracket-mounting assembly for mounting a mudflap bracket to a vehicle frame comprising a body having a frame-mounting portion and a bracket-mounting portion, the frame-mounting portion having a frame face at one side of the frame-mounting portion adapted to abut the vehicle frame and a tapped lateral hole transverse to the frame face and the bracket-mounting portion having a vertically-extending shaft opening extending at least a portion of the way through the body for removably mounting the mudflap bracket; a bolt threadably received in the tapped lateral hole in the frame-mounting portion for securing the body to the frame; and a rotation-resisting connector on the frame-mounting portion adapted to interface with the vehicle frame to resist relative rotation of the body with respect to the vehicle frame about the axis of the bolt.

DESCRIPTION OF THE PREFERRED EMBODIMENT

Figure 1:
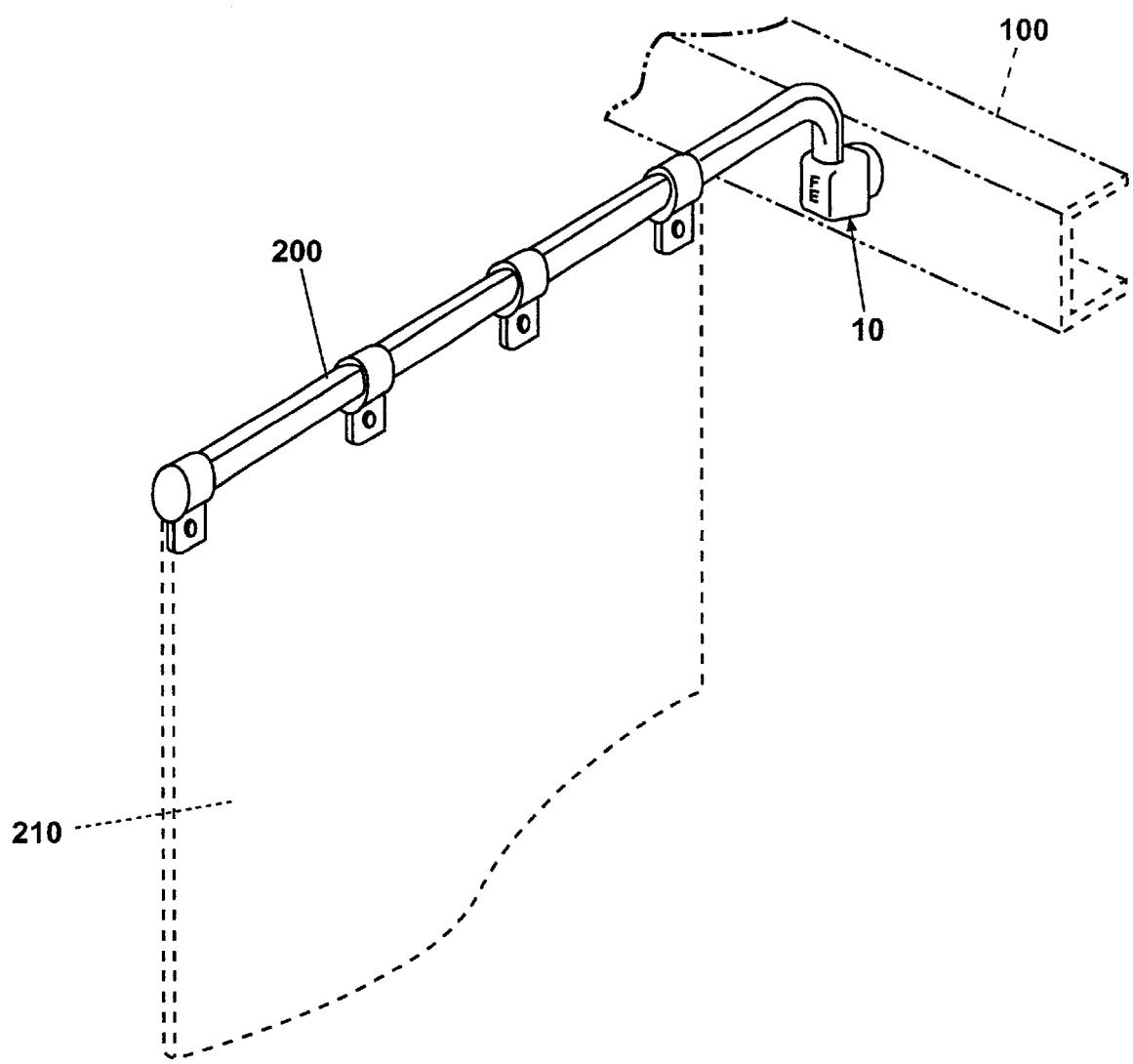
FIG. 1 is perspective view of the single-bolt bar-bracket mount according to the invention, mounted to a vehicle frame, and carrying a bar bracket.
Figure 3:
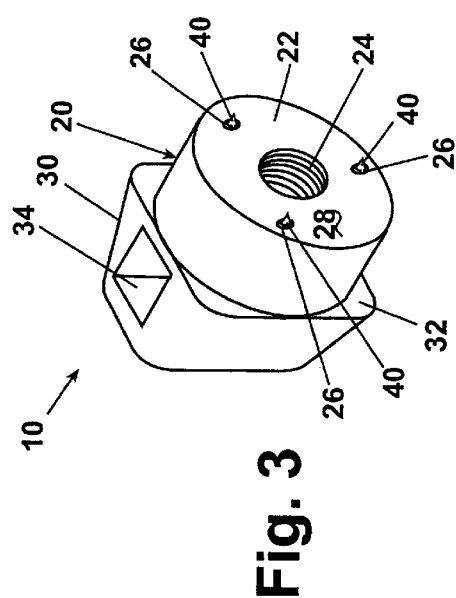
FIG. 3 is a reverse perspective view of the bar-bracket mount of FIG. 1.
Figure 2:
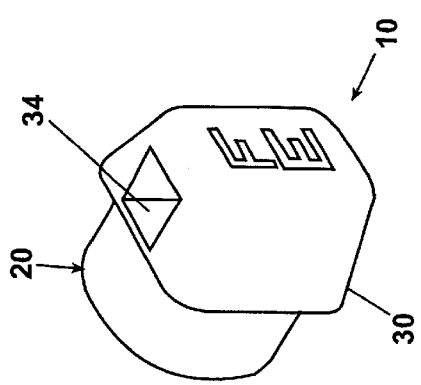
FIG. 2 is a perspective view of the bracket mount of FIG. 1.

FIG. 1 depicts the bar-bracket mount 10 according to the invention installed on a vehicle frame 100 and carrying a typical bar bracket 200 for a mudflap 210. The bar bracket 200 and the mudflap 210 are conventional and form no part of the invention except in combination with the bar-bracket mount. The bar bracket has a horizontally extending portion and a vertical extending portion. Referring now to FIGS. 2 and 3, the bar-bracket mount 10 is comprised of two body portions. A first cylindrical portion 20 comprises a solid body 22 with a threaded shaft 24 centered on the longitudinal axis of the cylindrical portion 20. The second body portion 30 is a solid of generally trapezoidal cross section. The width of the base 32 of the second body portion 30 is generally equal to the diameter of the cylindrical portion 20. The base 32 is connected to one end of the cylindrical portion 20. The portions 20, 30 are preferably unitary, as in a casting, but can be formed separately and connected in a conventional manner such as by welding. The bar bracket mount is preferably made of steel or other high strength metal.

Figure 5:
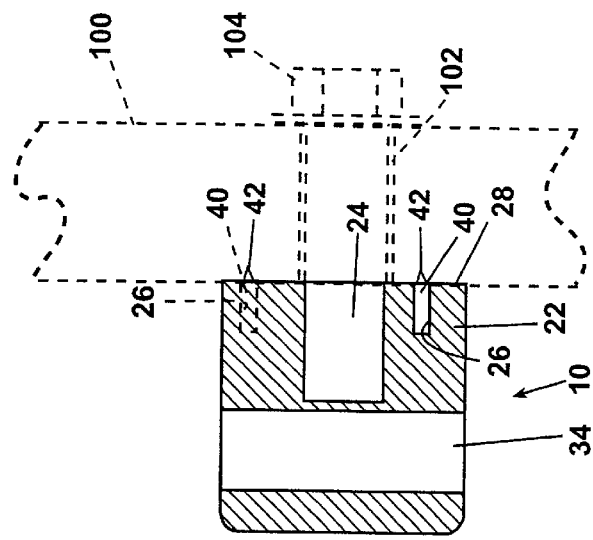
FIG. 5 is a cross-sectional view of the bar-bracket mount, taken along line 5—5 of FIG. 4.
Figure 4:
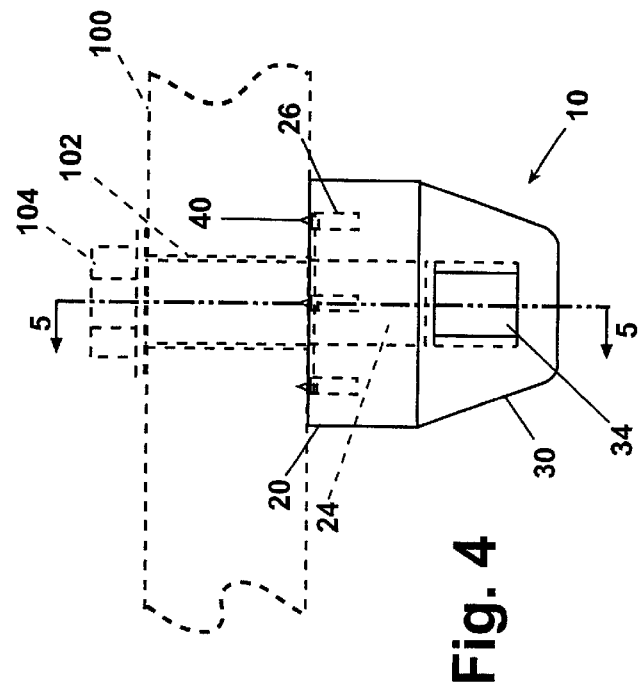
FIG. 4 is a top view of the bar-bracket mount of FIGS. 1 and 2.

As seen in FIG. 3, the cylindrical portion 20 of the bar-bracket mount 10 further comprises a plurality of wells 26 set into a face 28 of the body 22 of the cylindrical portion 20. As better seen in FIG. 4, these wells 26 are parallel to the longitudinal shaft 24. Each of the wells 26 is adapted to receive a steel pin 40. Each steel pin 40 has an end 42 that protrudes from the well 26, away from face 28 of the cylindrical portion 20, opposite the second body portion 30. The steel pins 40 are adapted to impinge upon a surface of the vehicle frame 100, against which the face 28 of the bar bracket mount 10 is placed. The longitudinal threaded shaft 24 of the cylindrical portion 20 is shown in shadow in FIG. 4, aligned but transverse to a square shaft opening 34 that passes through the second body portion 30 of the bar-bracket mount 10. This relationship is better shown in FIG. 5, a cross section through line 5—5 of FIG. 4. The longitudinal shaft 24 of the cylindrical portion 20 is of limited depth and does not pass into the opening 34 of the second body portion 30 of the bar-bracket mount 10.

In use, the bar-bracket mount 10 is aligned with a generally horizontal opening 102 through a vehicle frame 100, and a threaded bolt 104 is passed through the opening 102 in the vehicle frame 100 and into the threaded shaft 24. The threaded bolt 104, of necessity, will be of a length such that, upon passing through the vehicle frame 100 and into the shaft 24 of the bar-bracket mount 10, it will not bottom out in the shaft 24 of the bar-bracket mount 10, but will draw the face 28 fast against the vehicle frame 100, with the end 42 of each steel pin 40 impinging upon and gripping the surface of the vehicle frame 100. During installation, the installer will ensure that the square shaft opening 34 of the second body portion 30 of the bar-bracket mount 10 is given the proper orientation, i.e. vertical, before tightening the single bolt 104 that secures the bar-bracket mount 10 to the vehicle frame 100.

The single bolt bar-bracket mount 10 therefore provides the advantage of maintaining a bar bracket 200 and associated mudflap 20 in the proper orientation with respect to a vehicle frame 100, i.e. vertically, while also presenting the advantage of limiting the number of penetrations through the vehicle frame 100, thereby simplifying and speeding installation. It further eliminates the requirement that a bar-bracket mount have multiple openings properly configured to match the multiple penetrations existing in the vehicle frame.

While the invention has been specifically described in connection with certain specific embodiments thereof, it is to be understood that this is by way of illustration and not of limitation. Reasonable variation and modification are possible within the scope of the forgoing description and drawings without departing from the spirit of the invention.

What is claimed is:

1. In combination with a mudflap bar bracket adapted to mount a mudflap, the mudflap bar bracket having a horizontal portion adapted to mount a mudflap and a vertical portion; a bracket-mounting assembly for mounting the mudflap bracket to a vehicle frame, the bracket-mounting assembly comprising:

a body having a frame-mounting portion and a bracket-mounting portion;

the frame-mounting portion having a frame face at one side of the frame-mounting portion adapted to abut the vehicle frame and a tapped lateral hole transverse to the frame face;

the bracket-mounting portion having a vertically-extending shaft opening extending at least a portion of the way through the bracket-mounting portion for removably mounting the mudflap bracket;

a bolt threadably received in the tapped lateral hole in the frame-mounting portion for securing the body to the frame; and at least one rotation-resisting pin mounted in at least one well in the frame-mounting portion, spaced from the tapped lateral hole, and having a pointed end projecting from the frame face for gripping a surface of the vehicle frame to resist relative rotation of the body with respect to the vehicle frame.

2. The bracket-mounting assembly of claim 1 wherein the body is a casting.

3. The bracket-mounting assembly of claim 1 wherein the mudflap bar bracket vertical portion is removably mounted into the vertically-extending shaft opening.

4. The bracket-mounting assembly of claim 3 wherein the shaft opening has a rectilinear cross-section.

5. A bracket-mounting assembly for mounting a mudflap bracket to a vehicle frame, comprising:

a body having a frame-mounting portion and a bracket-mounting portion;

the frame-mounting portion having a frame face at one side of the frame-mounting portion adapted to abut the vehicle frame and a tapped lateral hole transverse to the frame face; and the bracket-mounting portion having a vertically-extending shaft opening extending at least a portion of the way through the bracket-mounting portion for removably mounting the mudflap bracket;

a bolt threadably received in the tapped lateral hole in the frame-mounting portion for securing the body to the frame; and at least one pin mounted in at least one well in the frame-mounting portion, spaced from the lateral hole, and having a pointed end projecting from the frame face for gripping a surface of the vehicle frame to resist relative rotation of the body with respect to the vehicle frame.

6. The bracket-mounting assembly of claim 5, wherein the body is a casting.

7. The bracket-mounting assembly of claim 5 wherein the at least one rotation-resisting pin comprises a plurality of pins mounted in wells spaced about the tapped lateral hole.

* * * * *